(12) United States Patent
Arisawa

(10) Patent No.: US 6,193,164 B1
(45) Date of Patent: Feb. 27, 2001

(54) IC CARD AND IC CARD SYSTEM

(75) Inventor: Shigeru Arisawa, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/243,671

(22) Filed: Feb. 2, 1999

(30) Foreign Application Priority Data

Feb. 10, 1998 (JP) .................................................. 10-028293

(51) Int. Cl.[7] .......................... G06K 19/00; G06K 19/06
(52) U.S. Cl. ........................ 235/492; 235/487; 340/10.2; 340/825.5
(58) Field of Search ..................................... 235/492, 375, 235/487; 340/825.54, 825.5, 825.34, 10.2

(56) References Cited

U.S. PATENT DOCUMENTS

| 4,546,241 | 10/1985 | Walton | 235/380 |
|---|---|---|---|
| 4,691,202 | 9/1987 | Denne et al. | 340/825.54 |
| 4,963,887 | 10/1990 | Kawashima et al. | 342/44 |
| 5,418,353 | 5/1995 | Katayama et al. | 235/380 |
| 5,426,423 | 6/1995 | Raimbault et al. | 340/825.35 |
| 5,517,194 | 5/1996 | Carroll et al. | 342/50 |

FOREIGN PATENT DOCUMENTS 0 677 815 A2   3/1995 (EP) ................................ G06K/7/10

*Primary Examiner*—Michael G Lee
*Assistant Examiner*—Daniel St. Cyr
(74) *Attorney, Agent, or Firm*—Limbach & Limbach L.L.P.

(57) ABSTRACT

An IC card and an IC card system for transmitting a signal modulated with a desired data sequence. In the IC card, a reference signal having the same frequency as a carrier of a transmission signal received by an antenna and phase-synchronized with the carrier is formed, and a response data sequence corresponding to the desired data sequence is sent out from the antenna by modulating the reference signal with the response data sequence in a phase shift keying manner.

19 Claims, 5 Drawing Sheets

IC CARD AND IC CARD SYSTEM

BACKGROUND OF THE INVENTION

1. Field of the Invention

The present invention relates to an IC card and an IC card system and, more particularly, to an IC card which transmits in a non-contact manner a signal modulated with desired data and to an IC card system using the IC card.

2. Description of the Related Art

IC card systems using IC cards have been applied to ticket examination systems for use in transport facilities, room entry/exit control systems, etc. An IC card system of this kind has been proposed which is constituted of IC cards carried by users and a read/writer (i.e., IC card processor) for exchanging various sorts of data with each of the IC cards. Various sorts of data are transmitted and received between the IC card and the read/writer in a non-contact manner.

That is, in this kind of IC card system, the read/writer forms a transmission signal by modulating a carrier having a predetermined frequency with a desired data sequence, and sends out the transmission signal to the IC card via an antenna.

The IC card receives the transmission signal via an antenna and demodulates the transmission signal to reproduce the data sent from the read/writer. Further, the IC card sends out data such as personal information stored therein to the read/writer in response to the received data by modulating a predetermined carrier with the data to be transmitted.

The read/writer receives the data sent from the IC card, and opens or closes a door of a ticket examination machine or allows entry into or exit from a room.

A type of IC card for such use has been proposed which is arranged to send out desired data to a read/writer by the method of changing the power radiated from the antenna by changing the load impedance of the antenna (hereinafter referred to as "load switching system").

That is, in the antenna of the IC card, a transmission signal sent from the read/writer is induced and this transmission signal is reradiated. If at this time the load impedance of the antenna is changed, the reradiated power is correspondingly changed. Then, in the receiving antenna coupled to the antenna of the IC card, the carrier of the transmission signal is detected at the signal level corresponding to the change in the load impedance.

In such a load switching system, desired data can be sent out by being modulated in an amplitude shift keying (ASK) manner based on a simple arrangement. The overall configuration can be correspondingly simplified.

This kind of IC card is carried by a user and is brought close to the read/writer when used. Therefore, the signal level of the transmitted signal induced in the antenna varies largely depending upon use.

In the load switching system, therefore, there is a need to use a semiconductor device having a sufficiently high withstand voltage as a semiconductor device for changing the load impedance of the antenna to ensure the desired operation even when the signal level varies largely as described above. If a semiconductor device having such a sufficiently high withstand voltage is used, it is difficult to integrate the entire circuit of the IC card to the desired degree of integration.

As a solution for this problem, a method of processing the signal obtained from the antenna by clamping the signal may be used. If such a method is used, the power reradiated by following the change in the load impedance cannot be sufficiently changed. That is, the degree of amplitude shift keying modulation is reduced, resulting in a deterioration in data quality.

SUMMARY OF THE INVENTION

In view of these circumstances, an object of the present invention to provide an IC card and an IC card system capable of performing data exchange without a semiconductor device having a sufficiently large withstand voltage while being arranged as simply as the load switching system.

To achieve the above-described object, according to one aspect of the present invention, there is provided an IC card in which a reference signal having the same frequency as a carrier of a transmission signal received by an antenna and phase-synchronized with the carrier is formed, and in which a response data sequence is sent out from the antenna by modulating the reference signal with the response data sequence in a phase shift keying (PSK) manner.

According to another aspect of the present invention, there is provided an IC card in which the load on a power supply circuit for producing operating power by rectifying a transmission signal received by an antenna is changed according to a response data sequence.

According to still another aspect of the present invention, there is provided an IC card system constituted of each of the above-described IC cards.

According to a further aspect of the present invention, there is provided an IC card in which a reference signal having the same frequency as a carrier of a transmission signal received by an antenna and phase-synchronized with the carrier is formed, and in which the reference signal is selectively sent out from the antenna according to a response data sequence.

If, in an IC card, a reference signal having the same frequency as a carrier of a transmission signal received by an antenna and phase-synchronized with the carrier is formed, and if a response data sequence is sent out from the antenna by PSK-modulating the reference signal with the response data sequence, a reference signal can be stably formed by performing amplitude limitation of an input to a reference signal forming circuit for forming the reference signal, or by a like method, thereby sending out a response signal. In this manner, data exchange can be performed by a system arranged as simply as the load switching system without using a semiconductor device having a high withstand voltage.

If, in an IC card, the load on a power supply circuit for producing operating power by rectifying a transmission signal received by an antenna is changed according to a response data sequence, a response signal can be sent out with the same effect as in the case of changing the load impedance of the antenna. At this time, even if an excessively large transmission signal is received, the operation of exchanging data can be stably performed by clamping the output from the power supply circuit or by a like method. In this manner, data exchange can be performed by a system arranged as simply as the load switching system without using a semiconductor device having a sufficiently high withstand voltage.

Each of the thus-arranged IC cards can form an IC card system having a simple configuration.

An IC card may also be arranged in which a reference signal having the same frequency as a carrier of a transmission signal received by an antenna and phase-synchronized with the carrier is formed, and in which the reference signal is selectively sent out from the antenna according to a response data sequence, thereby enabling a system arranged as simply as the load switching system to perform data exchange without using a semiconductor device having a high withstand voltage.

DESCRIPTION OF THE PREFERRED EMBODIMENTS

Embodiments of the present invention will be described in detail with reference to the drawings.

(1) First Embodiment

Figure 2:
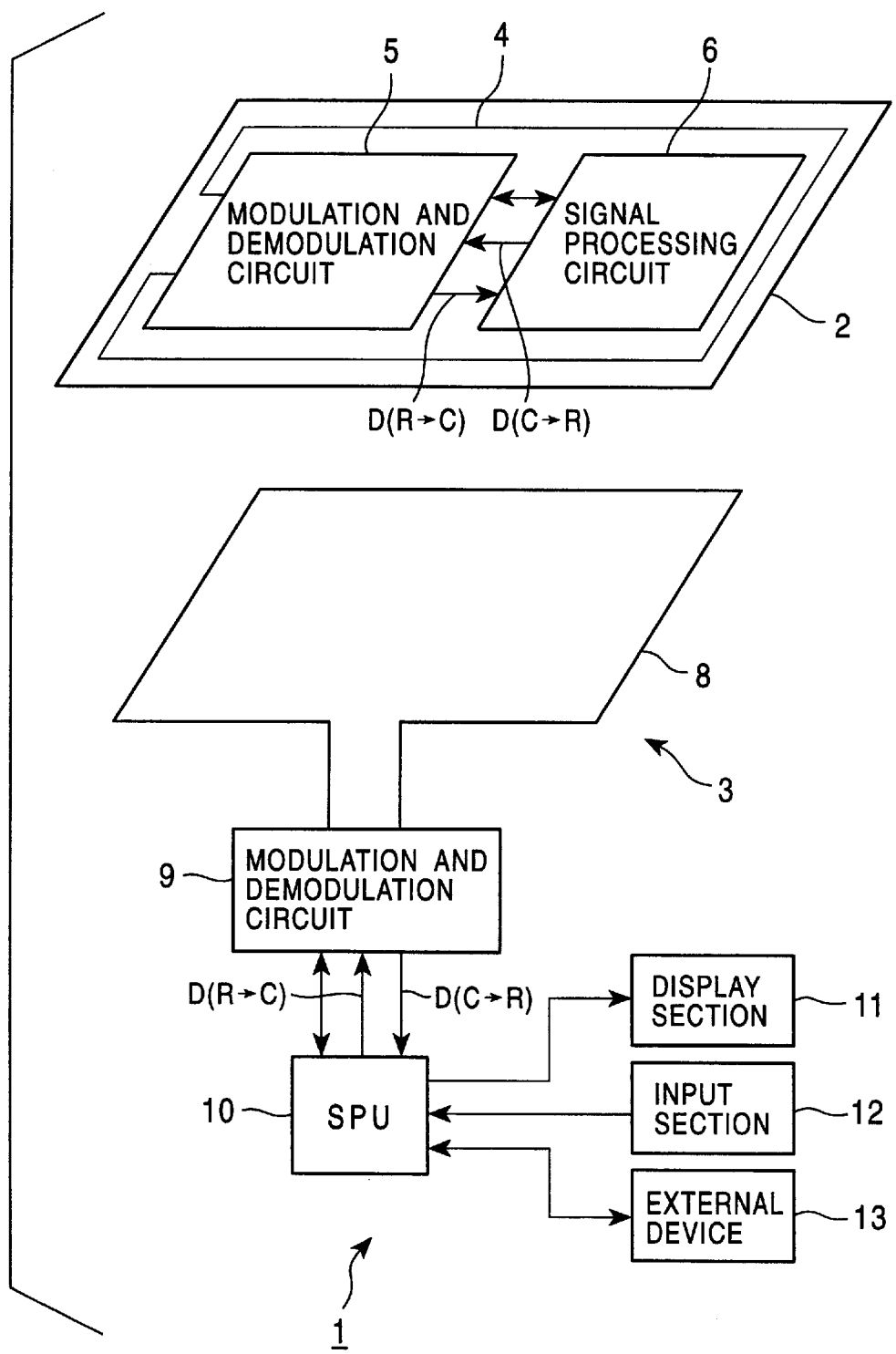
FIG. 2 is a block diagram showing the entire configuration of the IC card system shown in FIG. 1.

FIG. 2 is a block diagram showing an IC card system which represents a first embodiment of the present invention. This IC card system 1 is applied to, for example, a ticket examination system for use in transport facilities. In the IC card system 1, data is exchanged between an IC card 2 and a read/writer 3.

The IC card 2 is formed into the shape of a card by laminating a protective sheet and a base plate on which integrated circuits are mounted. The IC card 2 has a loop antenna 4 formed of a wiring pattern on the base plate. A modulation and demodulation circuit 5 and a signal processing circuit 6 are formed by the integrated circuits formed on the base plate.

The loop antenna 4 is coupled to a loop antenna 8 of the read/writer 3. The loop antenna 4 receives a transmission signal sent from the loop antenna 8 and radiates a response signal formed by the modulation and demodulation circuit 5.

The modulation and demodulation circuit 5 produces necessary electric power, a clock signal, etc., for the operation of the IC card 2 from a transmission signal received by the loop antenna 4. The modulation and demodulation circuit 5 operates by the electric power and the clock signal to demodulate the received transmission signal to retrieve a data sequence sent from the read/writer 3 (hereinafter referred to as "transmitted data sequence") D (R → C). The modulation and demodulation circuit 5 outputs the data sequence to the signal processing circuit 6. By this transmitted data sequence, the modulation and demodulation circuit 5 is urged to transmit a response signal. The modulation and demodulation circuit 5 forms the response signal from a data sequence (hereinafter referred to as "response data sequence") D (C → R) input from the signal processing circuit 6 and radiates the response signal by driving the loop antenna 4 by the response signal.

The signal processing circuit 6 operates by the electric power and the clock signal generated by the modulation and demodulation circuit 5 to analyze the transmitted data sequence D (R → C) and outputs a response data sequence D (C → R) to the modulation and demodulation circuit 5 by reading out this data sequence from an internal nonvolatile memory according to need.

In the read/writer 3, a modulation and demodulation circuit 9 receives a transmitted data sequence D (R → C) input from an signal processing unit (SPU) 10, and forms a transmission signal by modulating a carrier having a predetermined frequency in a binary phase shift keying (BPSK) or differential phase shift keying (DPSK) manner. As a method for this modulation, any of various modulation methods, such as ASK, PSK, Gaussian-filtered minimum shift keying (GMSK), frequency shift keying (FSK), and pulse modulation (PM), can be used according to need. The modulation and demodulation circuit 9 sends out the transmission signal from the loop antenna 8. Also, the modulation and demodulation circuit 9 processes a response signal received by the loop antenna 8 to retrieve a response data sequence D (C → R) sent from the IC card 2 by demodulation and outputs this response data sequence D (C → R) to the SPU 10.

In processing a transmission signal and a response signal as described above, the modulation and demodulation circuit 9 forms the transmission signal by a depth of modulation of about 10%, such that, when electric fields formed by the loop antennas 4 and 8 are measured and the frequency spectrum thereof is observed, the power ratio of the carrier to the total power is equal to or higher than 99%. The signal level of the carrier is thereby continuously maintained so as to be equal to or higher than a certain level when the transmission signal is received on the IC card 2 side. Simultaneously, the power of the sidebands is limited so as not to exceed a predetermined level.

The SPU 10 is constituted of a calculation processing unit for executing a comparatively simple processing procedure. The SPU 10 sends to the modulation and demodulation circuit 9 a transmitted data sequence D (R → C) to be transmitted to the IC card 2. The SPU 10 also processes a response data sequence D (C → R) input from the modulation and demodulation circuit 9. During this processing, the SPU 10 displays the progress and results of processing by a display section 11 according to need. The SPU 10 also changes the operation by a command from an input section 12 and exchanges data for a processing procedure, etc., with an external device 13 according to need.

Figure 1:
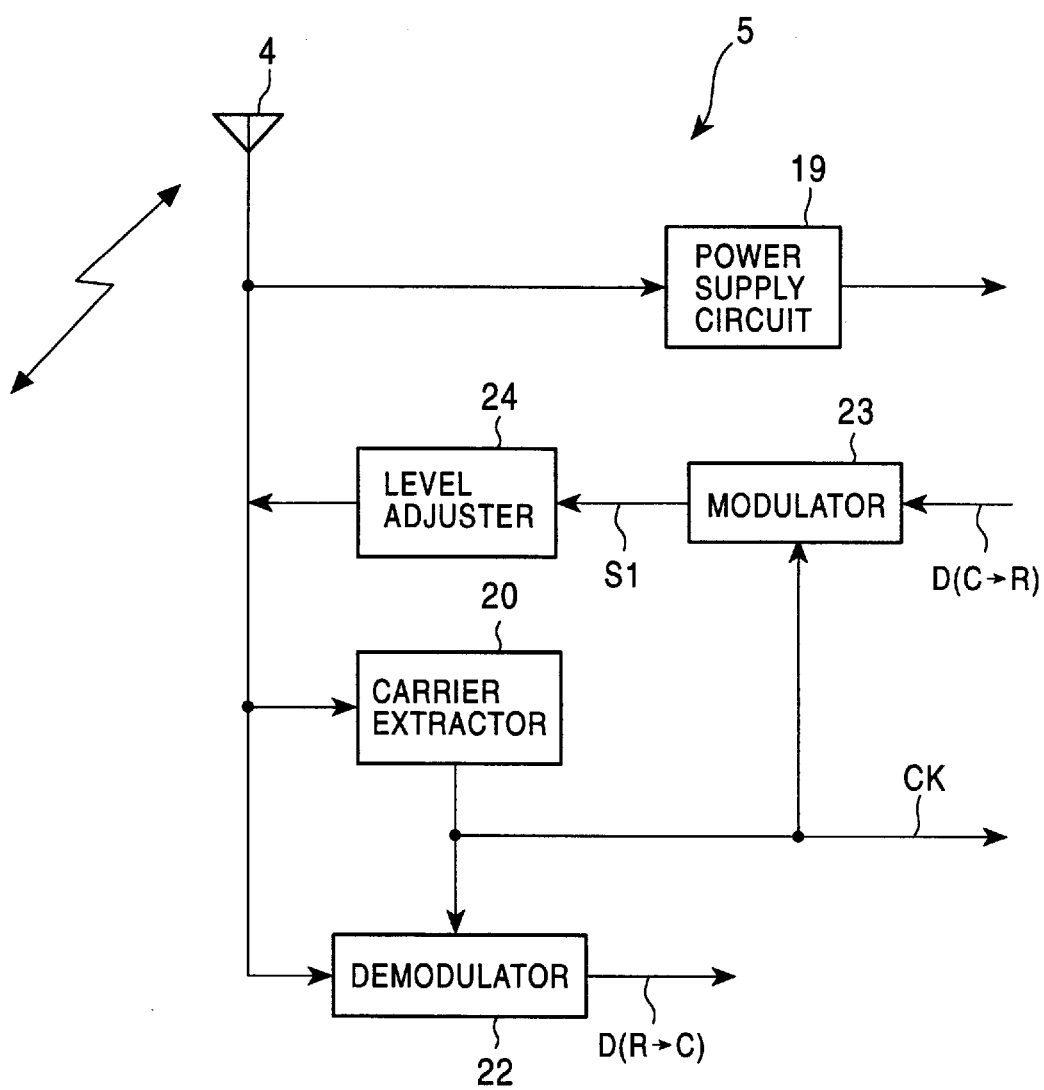
FIG. 1 is a block diagram showing a modulation and demodulation circuit in an IC card system which represents a first embodiment of the present invention.

FIG. 1 is a block diagram showing the modulation and demodulation circuit 5 of the IC card 2. In the modulation and demodulation circuit 5 on the IC card 2 side, a power supply circuit 19 receives a transmission signal induced in the loop antenna 4 and rectifies this transmission signal to generate power for operating the IC card 2.

A carrier extractor 20 is formed of a phase locked loop (PLL) circuit which operates by limiting the amplitude of the transmission signal received by the loop antenna 4. The carrier extractor 20 generates a clock signal CK having the same frequency as the carrier of the transmission signal and phase-synchronized with the carrier. The carrier extractor 20 divides this clock signal to form operating clock signals for the signal processing circuit 6 and to other components. Even if the power of the transmission signal received by the loop antenna 4 varies largely, the carrier extractor 20 generates, at a constant level, the clock signal CK having the same frequency as the carrier of the transmission signal and phase-synchronized with the carrier.

A demodulator 22 receives the transmission signal from the loop antenna 4 and processes and demodulates the transmission signal by using the clock signal CK output from the carrier extractor 20, thereby retrieving the transmitted data sequence D (R → C) transmitted by the transmission signal. The demodulator 22 outputs the transmitted data sequence D (R → C) to the signal processing circuit 6.

A modulator 23 is formed of a PSK modulator, and modulates the clock signal CK output from the carrier extractor 20 with the response data sequence D (C → R) to form a PSK-modulated signal S1.

A level adjuster 24 corrects the signal level of the PSK-modulated signal S1 to a predetermined signal level to form a response signal, and outputs the response signal to the loop antenna 4. The level adjuster 24 observes the signal level on the connection line to the loop antenna 4, and corrects the signal level of the modulated signal S1 so that the carrier observed on the line is maintained at a signal level equal to or higher than a certain value even if the logical level of the response data sequence D (C → R) varies, thereby enabling the carrier extractor 20 formed of a PLL circuit to operate stably.

In the IC card system 1 (FIGS. 1 and 2) arranged as described above, the carrier is modulated with the transmitted data sequence D (R → C) to be sent from the read/writer 3 to the IC card 2, and the modulated signal is sent out from the loop antenna 8.

When the IC card 2 is brought close to the read/writer 3 operating in this manner, the corresponding transmission signal is induced in the loop antenna 4 of the IC card 2. A portion of this induced transmission signal is converted into electric power for the IC card 2 by the power supply circuit 19. The modulation and demodulation circuit 5 and the signal processing circuit 6 and other components of the IC card 2 are driven by this electric power.

From the transmission signal obtained by the loop antenna 4, the transmitted data sequence D (R → C) is reproduced by the demodulator 22. The transmitted data sequence D (R → C) is then analyzed in the signal processing circuit 6 to form the response data sequence D (C → R) to be sent to the read/writer 3. The response data sequence D (C → R) is input to the modulator 23.

In the modulator 23, the clock signal CK output from the carrier extractor 20 is modulated with the response data sequence D (C → R) to obtain PSK-modulated signal S1. The level of PSK-modulated signal S1 is corrected to a constant signal level by the level adjuster 24 and is thereafter output to the loop antenna 4.

Since the clock signal CK output from the carrier extractor 20 has the same frequency as the carrier of the transmission signal and phase-synchronized with the carrier, the PSK-modulated signal Si has the same frequency as the carrier of the transmission signal and has its phase changed in accordance with the response data sequence D (C → R). As the phase change in the response signal is radiated from the loop antenna 4, the response data sequence D (C → R) is transmitted.

Data exchange can be reliably performed by these means without using a semiconductor device having a sufficiently high withstand voltage to change the load impedance of the antenna as in the conventional load switching system.

Moreover, in the IC card system 1, even if the power of the transmission signal induced in the loop antenna 4 becomes large when the IC card 2 is brought closer to the read/writer 3, clock signal CK maintained at a constant signal level is produced by the carrier extractor 20, and the modulated signal S1 is formed from this clock signal CK to transmit the response data sequence D (C → R), thereby sending out the response signal from the loop antenna 4 by constant power.

In the case of the load switching system, when the IC card 2 is brought closer to the read/writer to increase the power of the transmission signal induced in the loop antenna 4, the current change at the time of switching is correspondingly increased, thereby increasing the transmission output. This increase in the transmission output becomes larger abruptly as the IC card is brought closer to the read/writer. Consequently, the response signal is received at an extremely large signal level due to such an increase in the transmission output, and there has been a need to adopt a certain means for coping with an excessively large input in some load switching systems.

In contrast, in this embodiment of the present invention, response signal is sent out by constant power from the loop antenna and the need for a means for coping with such an excessively large input can be eliminated. The configuration of the read/writer 3 can be correspondingly simplified.

According to the above-described arrangement, clock signal CK having the same frequency as the main carrier of the transmission signal sent from the read/writer 3 and phase-synchronized with the carrier is generated, and PSK-modulated signal S1 formed from this clock signal CK is sent out from the loop antenna 4. In this manner, the desired data exchange can be performed by a system arranged as simply as the load switching system without using a semiconductor device having a sufficiently high withstand voltage.

Therefore, the circuit components forming the IC card 2 can easily be combined into an integrated circuit. Also, damage to the IC card when a high voltage is applied to the IC card by static electricity or the like can be reduced in comparison with the conventional art.

Even if the power of the transmission signal induced in the loop antenna 4 is increased when the IC card 2 is brought closer to the read/writer 3, the response signal can be sent out from the loop antenna 4 at constant power. Therefore, the need for a means for coping with an excessively large input on the read/writer 3 side can be eliminated and the configuration of the read/writer 3 can be simplified.

Further, the method of forming the clock signal by limiting the amplitude of the input signal in the carrier extractor 20 also enables stable generation of clock signal CK while the power of the transmission signal induced in the loop antenna 4 is changed. Also, damage to the carrier extractor 20 can be reliably avoided thereby.

On the read/writer 3 side, the depth of modulation is set to 10%, so that the carrier can be continuously monitored in the response signal received by the loop antenna 4. As a result, the clock signal can be produced with stability in the carrier extractor 20 arranged as a PLL circuit, thereby making it possible to stably exchange data and to stably supply electric power from the power supply circuit 19.

Further, the ratio of the carrier power to the total power in the transmission signal is set to 99% or higher, thereby effectively reducing parasitic emissions.

(2) Second Embodiment

Figure 3:
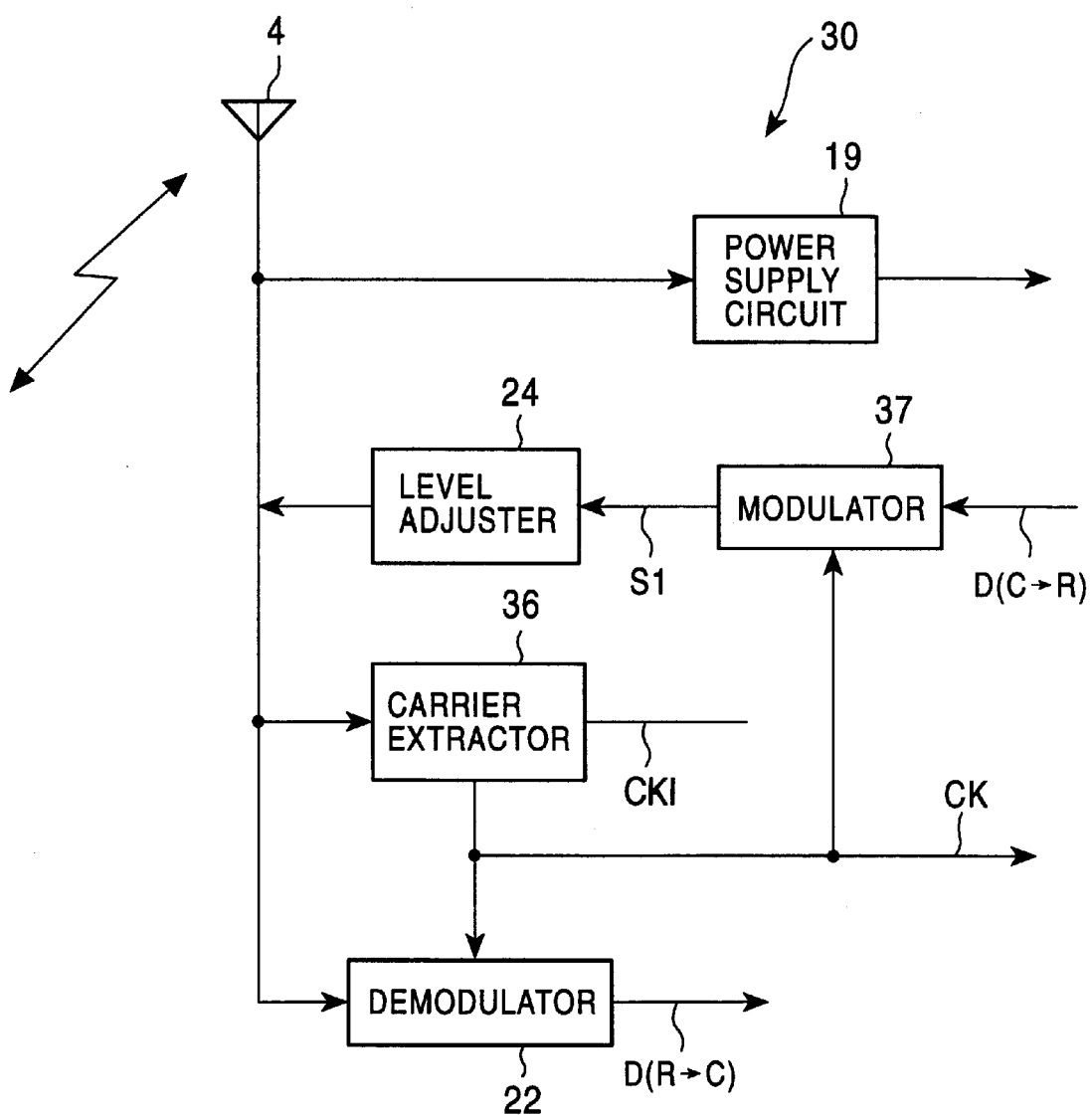
FIG. 3 is a block diagram showing a modulation and demodulation circuit in an IC card system which represents a second embodiment of the present invention.

FIG. 3 is a block diagram showing a modulation and demodulation circuit 30 of an IC card used in an IC card system which represents a second embodiment of the present invention. In the arrangement shown in FIG. 3, the same components as those described above with reference to FIG. 1 are indicated by the same reference numerals and the description for them will not be repeated.

In this embodiment, modulated signal S1 is formed by switching a clock signal CK having the same frequency as a carrier and phase-synchronized with the carrier and a clock signal CKI formed by inverting the signal level of the clock signal CK.

That is, in the modulation and demodulation circuit 30, a carrier extractor 36 forms clock signal CK from the output from the loop antenna 4 and outputs the clock signal CK. The carrier extractor 36 also forms and outputs clock signal CKI having a phase difference of 180° from the clock signal CK by forming an inverted signal of clock signal CK.

A modulator 37 is formed by a switching circuit which selects and outputs clock signal CK or CKI according to response data sequence D (C → R). The modulator 37 thereby outputs a PSK-modulated signal the phase of which is changed according to response data sequence D (C → R).

In the modulation and demodulation circuit 30, modulated signal S1 is output to the loop antenna 4 after the signal level of modulated signal S1 has been corrected by the level adjuster 24. The signal level of the carrier is thereby enhanced or lowered at the input terminal of the loop antenna according to response data sequence D (C → R), and PSK-modulated signal S1 thus formed is sent out.

According to the arrangement shown in FIG. 3, the modulated signal is formed by switching the clock signal CK having the same frequency as the carrier and phase-synchronized with the carrier and the clock signal CKI having a phase difference of 180° from the clock signal CK, so that the configuration of the modulator 37 for modulating response data sequence D (C → R) can be simplified while the same advantages as those of the first embodiments are achieved.

(3) Third Embodiment

Figure 4:
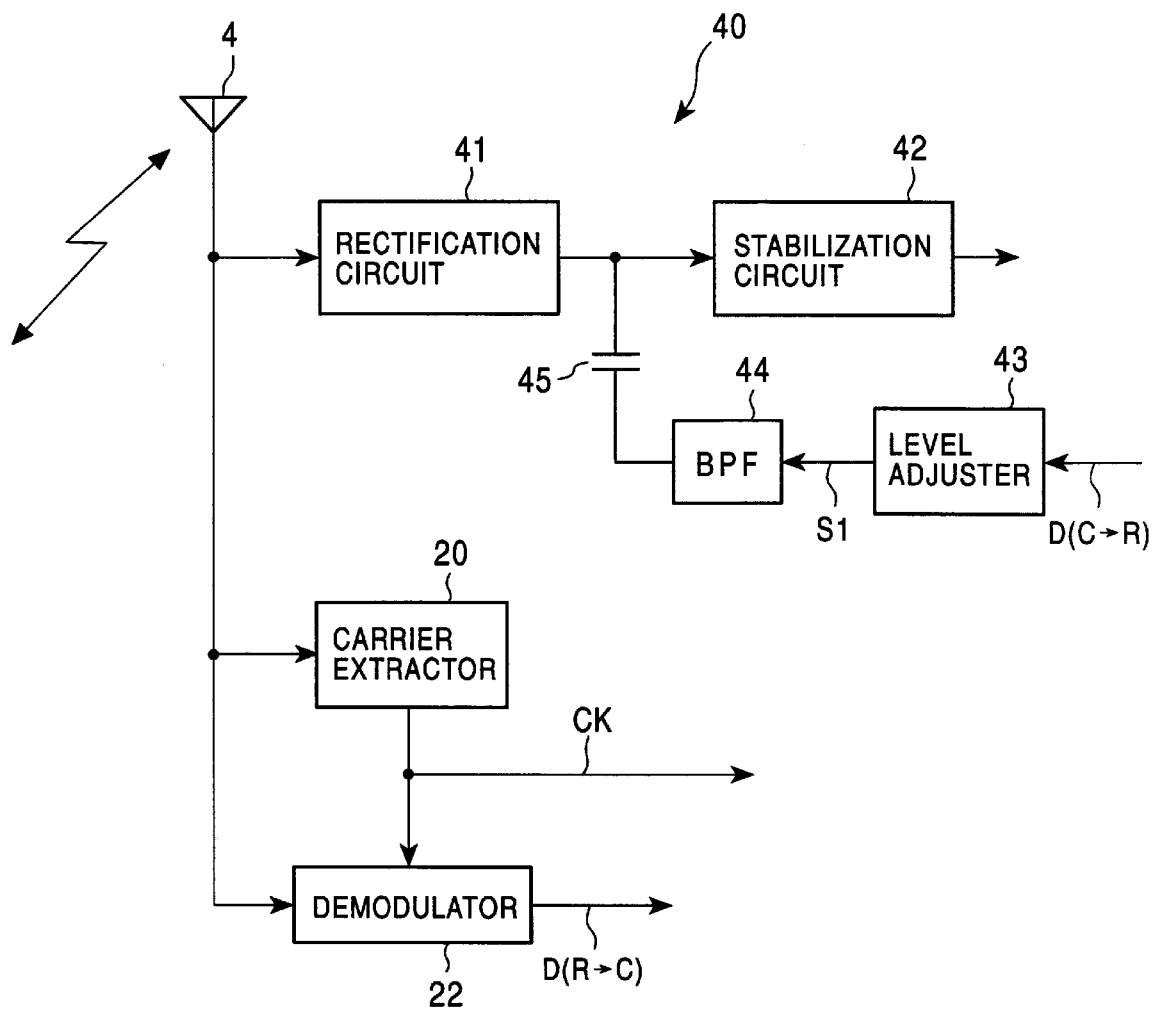
FIG. 4 is a block diagram showing a modulation and demodulation circuit in an IC card system which represents a third embodiment of the present invention.

FIG. 4 is a block diagram showing a modulation and demodulation circuit 40 of an IC card used in an IC card system which represents a third embodiment of the present invention. In this embodiment, to send out a response signal, the load impedance of the loop antenna 4 is changed by changing the power supply load. In this embodiment, the same components as those described above with reference to FIG. 1 are indicated by the same reference numerals and the description for them will not be repeated.

In this embodiment, a rectification circuit 41 rectifies a response signal output from the loop antenna 4 to produce electric power for the IC card 2. A stabilization circuit 42 stabilizes the output voltage of the rectification circuit 41 and supplies the stabilized output to the signal processing circuit, the demodulator 22 and other components.

A level adjuster 43 corrects the signal level of response data sequence D (C → R) to a predetermined signal level and outputs the corrected signal. A bandpass filter (BPF) 44 performs band limitation of the output signal of the level adjuster 43 and then outputs the signal to the output terminal of the rectification circuit 41 through a capacitor 45. The level adjuster 43 and the bandpass filter 44 thereby change the power supply load according to the logical level of response data sequence D (C → R). The load impedance of the loop antenna 4 is thereby changed to send out the response signal.

According to the arrangement shown in FIG. 4, the power supply load is changed according to the logical level of response data sequence D (C → R), so that data exchange can be performed by a system arranged as simply as the load switching system without using a semiconductor device having a particularly high withstand voltage for sending out response data D (C → R).

Therefore, the circuit components forming the IC card 2 can easily by combined into an integrated circuit. Also, damage to the IC card when a high voltage is applied to the IC card by static electricity or the like can be reduced in comparison with the conventional art.

Even if the power of the transmission signal induced in the loop antenna 4 is increased when the IC card 2 is brought closer to the read/writer 3, an abrupt increase in current at the time of switching, such as that observed in the load switching system, can be prevented, thereby making it possible to send out a response signal by stabilized power. Therefore, the need for a means for coping with an excessively large input on the read/writer 3 side can be eliminated and the configuration of the read/writer 3 can be simplified.

The power supply voltage output from the rectification circuit 41 has superposed pulsating components of the carrier. When the IC card is brought closer to the IC card processor, the signal level of the pulsating components increases. In this embodiment, however, such pulsating components are suppressed by the capacitor 45 and the bandpass filter 44, so that application of an excessively high voltage to the output terminal of the level adjuster 43 can be reliably avoided.

(4) Fourth Embodiment

Figure 5:
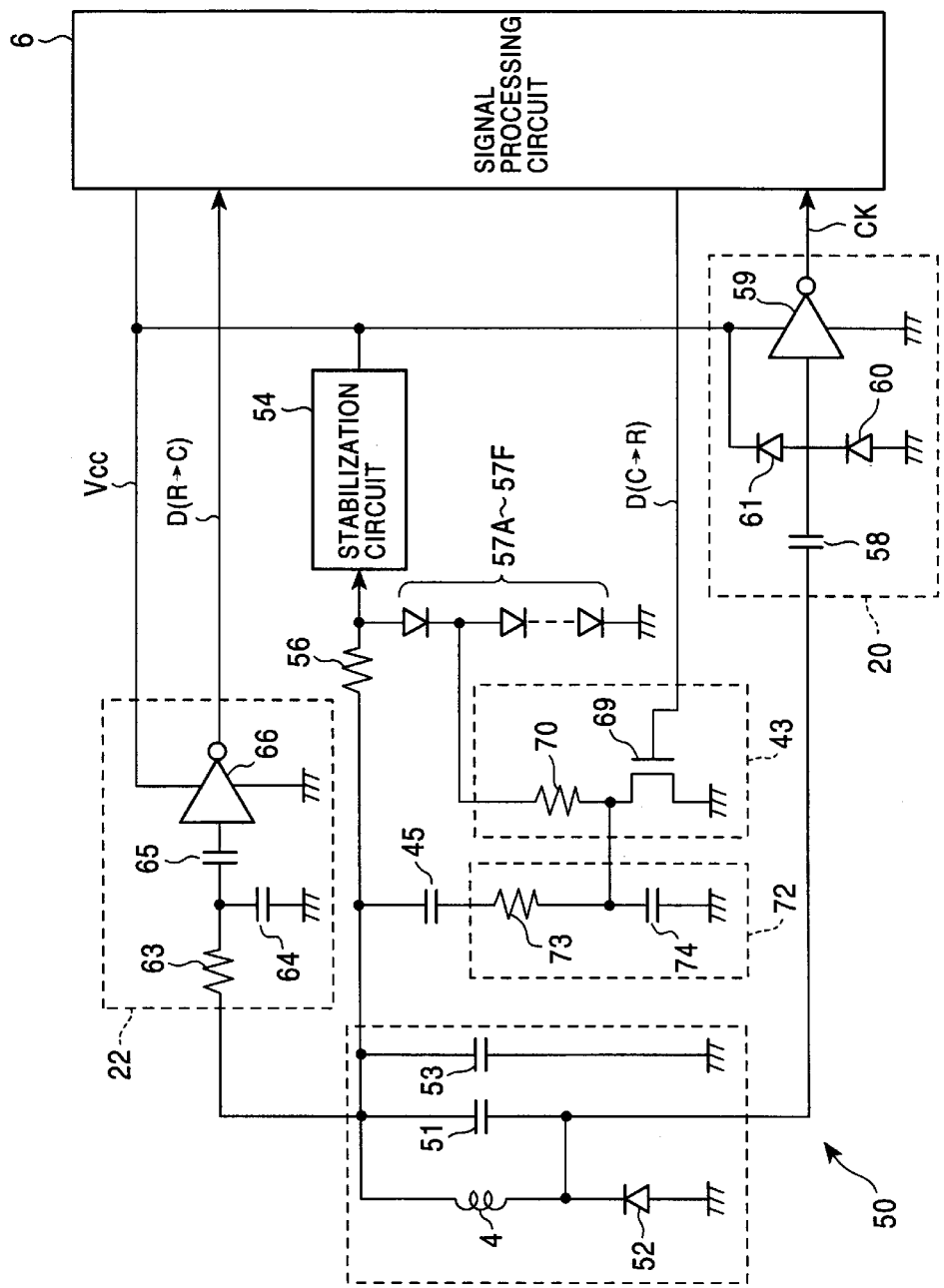
FIG. 5 is a block diagram showing a modulation and demodulation circuit in an IC card system which represents a fourth embodiment of the present invention.

FIG. 5 is a block diagram showing a modulation and demodulation circuit 50 of an IC card used in an IC card system which represents a fourth embodiment of the present invention. In the arrangement shown in FIG. 5, the same components as those described above with reference to FIG. 4 are indicated by the same reference numerals and the description for them will not be repeated.

In this embodiment, the read/writer forms a transmission signal by ASK modulation and sends out the formed signal.

In the modulation and demodulation circuit 50, a capacitor 51 is connected in parallel with loop antenna 4. The loop antenna 4 and the capacitor 51 form a parallel resonance circuit for resonance with a carrier. The loop antenna 4 is thus arranged to receive a transmission signal selectively and efficiently and to radiate a response signal efficiently.

A diode 52 having its cathode grounded is connected to one terminal of the loop antenna 4, and the other terminal of the loop antenna 4 is grounded by a capacitor 53. The loop antenna 4 is maintained by a rectification circuit formed of the diode 52 and the capacitor 53 as a detection circuit at a dc level obtained by rectifying the carrier. The terminal voltage of the loop antenna 4 maintained in this manner is changed according to a transmission signal and a response signal.

A stabilization circuit 54 is supplied with the terminal voltage of the loop antenna 4 via a resistor 56, and produces power for operating the IC card 2 from the power of a transmission signal received by the loop antenna 4. At this time, the stabilization circuit 54 grounds the power input by a clamp circuit formed by series connection of six diodes 57A to 57F, thereby reliably avoiding damage caused by an excessively large input voltage.

A carrier extractor 20 removes the dc component from the terminal voltage of the loop antenna 4 by a capacitor 58, performs binary recognition in reference to the zero level with a comparison circuit 59 operating by operating power supply VCC, and thereby produces clock signal CK having the same frequency as the carrier and phase-synchronized with the carrier. The carrier extractor 20 also has an amplitude limitation circuit formed of diodes 61 and 60 connected to the input terminal to reliably avoid an excessively large amplitude input.

A demodulator 22 performs band limitation of the terminal voltage of the loop antenna 4 with a low-pass filter formed of a resistor 63 and a capacitor 64, then removes the dc component with a capacitor 65, and inputs the voltage to a comparison circuit 66. The comparison circuit 66 operates by operating power supply VCC and performs binary recognition of the input voltage in reference to the zero level. The demodulator 22 obtains and outputs transmitted data sequence D (R → C) by this demodulation. At this time, in the demodulator 22, an excessively large amplitude input to the comparison circuit 66 is reliably avoided by inputting the terminal voltage of the loop antenna to the comparator 66 after band limitation has been performed by the low-pass filter formed of resistor 63 and capacitor 64 and after the dc component has been removed by capacitor 65.

A level adjuster 43 is formed of a FET 69 which forms a switching circuit and which operates by response data sequence D (C → R), and a resistor 70 for supplying power to the FET 69. The level adjuster 43 corrects the signal level of response data sequence D (C → R) to the signal level determined by the terminal voltage of the resistor 70, and outputs the corrected signal. In this embodiment, the resistor 70 is connected to the anode of the diode 57A closest to the resistor 56 in the group of diodes 57A to 57F forming the clamp circuit to supply power, thereby correcting the signal level of response data sequence D (C → R) to the signal level determined by the other diodes 57B to 57F and outputting the corrected response data sequence D (C → R).

A low-pass filter 72 is formed of a resistor 73 and a capacitor 74. The low-pass filter 72 performs band limitation of the output signal from the level adjuster 43 and then outputs the signal to one terminal of the loop antenna 4 via a capacitor 45.

According to the arrangement shown in FIG. 5, the same advantages as those of the third embodiment can also be achieved by performing band limitation of the output signal from the level adjuster 43 through the low-pass filter 72.

(5) Other Embodiments

The first to third embodiments have been described with respect to the case where the carrier extractor is formed by a PLL circuit, and the fourth embodiment has been described with respect to the case where the carrier extractor is formed by a comparison circuit. However, the present invention is not limited to these arrangements. In the first to third embodiments, the carrier extractor may alternatively be formed by a comparison circuit. In the fourth embodiment, the carrier extractor may alternatively be formed by a PLL circuit.

The embodiments have been described with respect to the case where a transmission signal is formed by modulation to a depth of 10%, but the present invention is not limited to this. If the power of the sidebands is not restricted by law, or in a like situation, the transmission signal may be formed by a depth of modulation smaller than 1 to achieve the same advantages as the above-described embodiments.

The embodiments have been described with respect to the case where the reference signal is sent out by being PSK-modulated, but the present invention is not limited to this. The reference signal may be sent out by being modulated by an ASK modulation method such that it is selectively sent out from the antenna according to the response data sequence.

The embodiments have been described with respect to the case where a loop antenna is used, but the present invention is not limited to this. A dipole antenna or any of other antennas having various shapes may alternatively be used.

The present invention can find various applications in which the frequency of main carrier is set to, for example, 13.56 MHz, a frequency in a microwave band or any other frequencies.

The embodiments have been described with respect to the case where the IC card is operated by electric power of a transmission signal, but the present invention is not limited to this, and can find various applications in which a battery or any other means is used to operate the IC card.

The embodiments have been described with respect to the case where an antenna is used in common for transmission and reception of data sequences on the IC card processor side, but the present invention is not limited to this. A complicated configuration may be allowed on the IC card processor side in comparison with the IC card configuration. Therefore, the present invention can find other various applications in which antennas respectively dedicated to transmission and reception are provided on the IC card processor side.

According to the present invention, as described above, an IC card capable of performing data exchange without a semiconductor device having a sufficiently large withstand voltage while being arranged as simply as the load switching system, and an IC card system using the an IC card can be obtained. This performance can be achieved by forming a reference signal having the same frequency as a carrier of a transmission signal and phase-synchronized with the carrier and forming a response signal by modulating the reference signal, or changing the load on the power supply circuit according to the response data sequence.

What is claimed is:

1. An IC card which transmits and receives desired data sequences in non-contact transmission between a predetermined processor, said IC card comprising:
   an antenna for receiving a transmission signal from the processor;
   a demodulation circuit for retrieving a transmitted data sequence sent from the processor by demodulating the transmission signal received by said antenna;
   a reference signal forming circuit for forming a reference signal having the same frequency as a carrier of the transmission signal received by said antenna and phase-synchronized with the carrier;
   a modulation circuit for sending out a response data sequence corresponding to the transmitted data sequence from said antenna by modulating the reference signal with the response data sequence in a phase shift keying manner; and
   a power supply circuit for producing operating power by rectifying the transmission signal received by said antenna, wherein said demodulation circuit and said modulation circuit operate by the power produced by said power supply circuit.

2. An IC card according to claim 1, wherein said reference signal forming circuit forms the reference signal by a phase locked loop circuit.

3. An IC card according to claim 1, wherein said reference signal forming circuit has an amplitude limitation circuit for limiting the amplitude of an input signal.

4. An IC card according to claim 1, wherein said modulation circuit performs pulse shift keying modulation with the response data sequence by changing and selectively outputting the reference signal and a phase reference signal having a phase difference of 180 degrees from the reference signal according to the response data sequence.

5. An IC card which transmits and receives desired data sequences in non-contact transmission between a predetermined processor, said IC card comprising:
   an antenna for receiving a transmission signal from the processor;
   a power supply circuit for producing operating power by rectifying the transmission signal received by said antenna;
   a demodulation circuit for retrieving a transmitted data sequence sent from the processor by demodulating the transmission signal received by said antenna; and
   a load circuit for changing a load on said power supply circuit according to a response data sequence corresponding to the transmitted data sequence.

6. An IC card according to claim 5, wherein said load circuit comprises a filter circuit for performing band limitation of the response data sequence and for thereafter outputting the response data sequence to an output terminal of said power supply circuit.

7. An IC card according to claim 5, further comprising a stabilization circuit for stabilizing power output from said power supply circuit.

8. The IC card of claim 7 wherein said stabilization circuit comprises a clamping device.

9. An IC card according to claim 5, wherein the transmission signal is formed so that the power of the carrier is 99% or higher of the total power.

10. An IC card according to claim 5, wherein the transmission signal is amplitude-modulated to a depth of modulation of approximately 10% or less.

11. The IC card of claim 5 wherein the load impedance of the antenna is changed according to said response data sequence corresponding to the transmitted data.

12. An IC card system comprising an IC card and an IC card processor between which desired data sequences are transmitted and received in a non-contact manner, said IC card having:

an antenna for receiving a transmission signal from said IC card processor;

a demodulation circuit for retrieving a transmitted data sequence sent from said IC card processor by demodulating the transmission signal received by said antenna;

a reference signal forming circuit for forming a reference signal having the same frequency as a carrier of the transmission signal received by said antenna and phase-synchronized with the carrier;

a modulation circuit for sending out a response data sequence corresponding to the transmitted data sequence from said antenna by modulating the reference signal with the response data sequence in a phase shift keying manner; and a level adjuster for correcting the signal level of the modulated signal output to said antenna, wherein said signal level is changed according to said response data sequence.

13. An IC card system comprising an IC card and an IC card processor between which desired data sequences are transmitted and received in a non-contact manner, said IC card having:

an antenna for receiving a transmission signal from said IC card processor;

a power supply circuit for producing operating power by rectifying the transmission signal received by said antenna;

a demodulation circuit for retrieving a transmitted data sequence sent from said processor by demodulating the transmission signal received by said antenna; and a load circuit for changing a load on said power supply circuit according to a response data sequence corresponding to the transmitted data sequence.

14. The IC card of claim 13 wherein the load impedance of the antenna is changed by the changing power supply load.

15. An IC card which transmits and receives desired data sequences in non-contact transmission between a predetermined processor, said IC card comprising:

an antenna for receiving a transmission signal from the processor;

a demodulation circuit for retrieving a transmitted data sequence sent from the processor by demodulating the transmission signal received by said antenna;

a reference signal forming circuit for forming a reference signal having the same frequency as a carrier of the transmission signal received by said antenna and phase-synchronized with the carrier; and a modulation circuit for selectively outputting the reference signal from said antenna according to a response data sequence corresponding to the transmission data sequence;

wherein said reference signal output from said antenna has a relatively constant power.

16. An IC card according to claim 15, wherein said reference signal forming circuit forms the reference signal by a phase locked loop circuit.

17. An IC card according to claim 15, wherein said reference signal forming circuit comprises an amplitude limitation circuit for limiting the amplitude of an input signal.

18. An IC card according to claim 15, wherein said demodulation circuit and said modulation circuit operate by power produced by said power supply circuit.

19. An IC card which transmits and receives desired data sequences in non-contact transmission between a predetermined processor, said IC card comprising:

an antenna for receiving a transmission signal from the processor;

a demodulation circuit for retrieving a transmitted data sequence sent from the processor by demodulating the transmission signal received by said antenna;

a reference signal forming circuit for forming a reference signal having the same frequency as a carrier of the transmission signal received by said antenna and phase-synchronized with the carrier;

a modulation circuit for sending out a response data sequence corresponding to the transmitted data sequence from said antenna by modulating the reference signal with the response data sequence in a phase shift keying manner; and a level adjuster for adjusting the level of the modulated reference signal to a relatively constant signal level.

* * * * *